(12) United States Patent
Meyers

(10) Patent No.: US 8,082,824 B2
(45) Date of Patent: Dec. 27, 2011

(54) CONTACT LENS STOCK HOLDING APPARATUS

(75) Inventor: William E. Meyers, Scottsdale, AZ (US)

(73) Assignee: Paragon Vision Sciences, Inc., Mesa, AZ (US)

( * ) Notice: Subject to any disclaimer, the term of this patent is extended or adjusted under 35 U.S.C. 154(b) by 244 days.

(21) Appl. No.: 12/429,064

(22) Filed: Apr. 23, 2009

(65) Prior Publication Data
US 2010/0270694 A1    Oct. 28, 2010

(51) Int. Cl.
 *B29D 11/00* (2006.01)
 *B23B 31/10* (2006.01)
(52) U.S. Cl. .......................................... 82/1.11; 82/118
(58) Field of Classification Search .................. 82/1.11, 82/117, 118, 155; 156/154, 153, 196; 451/42; 264/1.1, 1.32
See application file for complete search history.

(56) References Cited

U.S. PATENT DOCUMENTS

| | | | |
|---|---|---|---|
| 3,283,446 A | 11/1966 | Feinbloom | |
| 3,460,928 A | 8/1969 | Casko | |
| 4,693,572 A * | 9/1987 | Tsuetaki et al. | 351/161 |
| 4,936,850 A * | 6/1990 | Barrett | 623/6.44 |
| 5,528,321 A * | 6/1996 | Blum et al. | 351/160 R |
| 5,683,456 A * | 11/1997 | Blake | 623/6.23 |
| 5,931,068 A | 8/1999 | Council, Jr. et al. | |
| 5,972,251 A | 10/1999 | Shannon | |
| 7,187,859 B2 * | 3/2007 | Stute | 396/661 |

OTHER PUBLICATIONS

International Search Report and Written Opinion for International Application No. PCT/US2010/032117 dated Jun. 15, 2010.

* cited by examiner

*Primary Examiner* — Will Fridie, Jr.
(74) *Attorney, Agent, or Firm* — Snell & Wilmer L.L.P.

(57) ABSTRACT

The present invention is directed toward the design of a holding apparatus which allows contact lens lathes to hold contact lens buttons during the contact lens manufacturing process. The holding apparatus functions to hold lenses manufactured from a different sized stock than what the lens manufacturing equipment is designed to hold.

In general the holding apparatus has a circular portion having a mating surface on a one side and a cylindrical protrusion extending from the other side. A contact lens lathe can hold the cylindrical protrusion of the holding apparatus while the mating surface mates with a surface on a contact lens button. The lens button and holding apparatus surfaces can be modified to allow more efficient machining of the lens buttons.

1 Claim, 4 Drawing Sheets

CONTACT LENS STOCK HOLDING APPARATUS

FIELD OF INVENTION

The present invention relates to a holding apparatus which allows contact lens lathes to hold contact lens buttons during the contact lens manufacturing process.

BACKGROUND OF THE INVENTION

Contact lenses have been manufactured and broadly distributed for decades. In a typical lens manufacturing process, rods of contact lens stock material are sliced into small blanks, disks, or buttons. Each button is then mounted into a collet on a lathe and turned to the desired specifications.

Generally, contact lenses fall within a relatively narrow range of diameters. This narrow range of lens diameters meant the industry typically used a limited range of sizes of contact lens stock material. With a limited range of stock sizes in use, the industry typically only needed manufacturing equipment configured to function on this narrow range of stock sizes.

Due to improvements in contact lens technology and driven by other various desires and benefits, larger diameter contact lenses are now being used. This advance in lens technology resulted in the need for a larger diameter lens stock and buttons. However, the presence of a larger lens stock poses a problem because the lathes in the industry are typically set up for smaller sizes of contact lens stock. Furthermore, machining larger diameter lens stock also poses a problem because larger diameter lens stock, especially lens stock made from material with high oxygen permeability, tends to experience a greater amount of flexure, which causes geometric distortion, than what typical sized lens stock experiences during machining.

A current solution to the lathe collet size problem provides for the manufacture and supply of buttons with an integral protrusion machined onto the blank. This concept is illustrated in FIG. 4. The blank's protrusion enables a typical lathe collet to hold onto the button. However, in order to machine the protrusion onto the blank, the blank must be cut longer and machined in an additional process. Furthermore, the added machining step significantly increases tool cost. Thus, the integrated protrusion is an inefficient solution.

Accordingly, there exists a need for a device that overcomes these and other shortcomings.

SUMMARY OF THE INVENTION

In exemplary embodiments, the present invention provides an apparatus that assists in manufacturing contact lenses, especially lenses manufactured from a different sized stock than what the lens manufacturing equipment is designed to hold.

In exemplary embodiments, the present invention provides for a holding apparatus that has a circular portion having a mating surface on a first side and a cylindrical protrusion extending from a second side. The contact lens lathe can hold the cylindrical protrusion of the holding apparatus while the mating surface mates with a surface on a contact lens button. In an exemplary embodiment, the lens button and holding apparatus surfaces can be modified to allow more efficient machining of the lens buttons.

BRIEF DESCRIPTION OF THE DRAWINGS

The exemplary embodiments of the present invention will be described in conjunction with the appended drawing figures in which like numerals denote like elements and.

DETAILED DESCRIPTION

Figure 1:
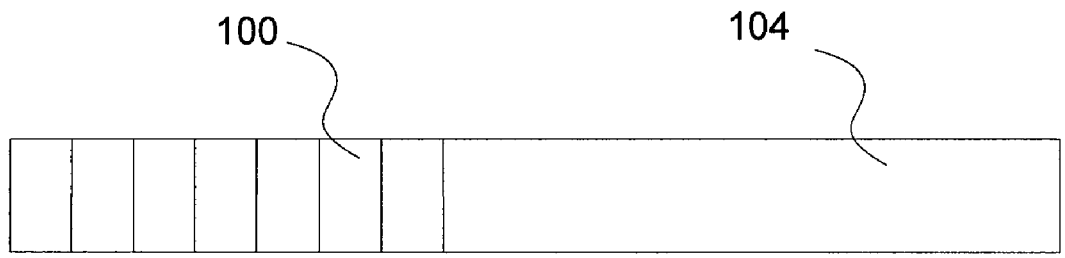
FIG. 1 is a cross sectional side view of contact lens stock showing the profile of flat surface lens buttons as they are cut from the stock.

The present invention relates to a holding apparatus which allows contact lens lathes to hold contact lens buttons during the contact lens manufacturing process. One skilled in the art will appreciate the various aspects of the invention may be realized by any number of materials or methods configured to perform the intended functions. For example, other materials or methods may be incorporated herein to assist in the mating between a lens button and a holding apparatus. It should also be noted that the drawings herein are not all drawn to scale, but may be exaggerated to illustrate various aspects of the invention, and in that regard, the drawings should not be limiting.

A holding apparatus in accordance with the present invention allows an uncommonly sized contact lens stock button on a lathe not configured to machine the uncommonly sized button. For example, the holding apparatus enables the turning of buttons of larger diameters on a lathe that is configured for the smaller diameter button stock commonly used in the contact lens industry.

A holding apparatus in accordance with the present invention works with contact lens buttons of various, sizes, shapes, and materials. For example, an exemplary lens material can be a uniform material or a composite material. Lens buttons can have flat, curved, conical, or various other surfaces. A holding apparatus can work with typical lens sizes, provided the holding apparatus is sized accordingly or the apparatus can work with larger button sizes.

A holding apparatus in accordance with the present invention limits the flexure during machining. As stated previously, flexure from machining causes geometric distortions which, upon relaxation, results in lens distortion. This flexure is greater in lenses with high oxygen permeability. The flexure is also compounded by larger diameter lenses because of the greater leverage exerted on the larger diameter lenses by the lathe tool. The holding apparatus in accordance with present invention provides support for the larger diameter lens reducing flexure.

An exemplary holding apparatus may function as a fixture to hold the larger buttons in the smaller lathes. For example, the contact lens button may be 22-24 mm in diameter. In situations where the contact lens lathe is configured for a lens button of a smaller diameter (e.g., about 12-14 mm in diameter) the lathe collet generally can not hold the 22-24 mm button. However, the apparatus of the present invention can facilitate the machining of the 22-24 mm button in a collet setup for a different size button by virtue of the collet engaging the holding apparatus, while the holding apparatus holds the lens button.

For example, an exemplary holding apparatus may function as an "imitation" of smaller diameter contact lens stock. Because typical lathes are setup to hold a stock smaller than 22-24 mm in diameter, the apparatus in accordance with the present invention allows the larger diameter stock to "imitate" the smaller diameter stock. In one example, the holding apparatus of the present invention has two diameters, one diameter to match the smaller collet size and a second diameter to match the larger 22-24 mm button size. In such an embodiment, the smaller diameter may be a protrusion from the second larger diameter. Thus, in this example, the lathe collet can hold the protrusion while the button can mate with the larger diameter.

A holding apparatus in accordance with the present invention enables greater efficiencies in the manufacturing of the contact lenses. For example, manipulating the shape of the button surfaces during button formation allows for less machining and less removal of material to achieve the desired contact lens specifications. Further, by requiring less machining and material removal, efficiencies of time, cost, and tool wear may be realized. In one exemplary embodiment, the apparatus can be configured to hold various shapes of button surfaces during the machining process.

As stated previously and as illustrated in the exemplary embodiments herein, the structure of the holding apparatus allows for a collet to hold a button. In one exemplary embodiment, the holding apparatus can be a separate device that can be attached to the contact lens button. In this embodiment, the apparatus would be configured with a protrusion that can be held by the collet of a typical contact lens lathe.

In various embodiments where the holding apparatus functions as a separate device, the apparatus also has a means to engage or mate with the button. This engagement functions to hold the button firmly in place. While the contact lens button is being turned on a lathe there should be a physical engagement that prevents the button from slipping due to the forces caused by the machining. In this regard, any method that creates this positive physical engagement between the holding apparatus and the lens button can be incorporated, such as, for example, adhesive or mechanical engagement.

One skilled in the art will appreciate that the holding apparatus will not remain permanently attached to the contact lens. Further, one skilled in the art will also appreciate that at most, minimal damage should be inflicted on the lens due to the engagement or the breaking of the engagement with the holding apparatus. Accordingly, in various exemplary embodiments, the holding apparatus comprises a means for subsequently breaking the engagement. After machining, the apparatus is removed from the button by breaking the engagement. In one exemplary embodiment, the engagement means is a water soluble adhesive. Accordingly, after the initial machining, when the apparatus needs removed, the apparatus and lens can be submersed in water to break the adhesion. The contact lens can then be cleaned and sent on to subsequent processes.

In another exemplary embodiment, the engagement means is a non-water soluble adhesive. In this embodiment, the adhesive should be soluble in a solvent, though generally, the solvent should not be one in which the contact lens material would be significantly damaged. In various exemplary embodiments, the holding apparatus may also be surface treated to improve adhesive properties.

In other embodiments, the engagement between the holding apparatus and the button may be accomplished by friction, vacuum, or any physical or mechanical reaction between the holding apparatus and the button. Further, the structure of the holding apparatus should be such that the physical or chemical engagement means is possible. In one example, the holding apparatus can have short posts that would be inserted in to machining holes in the button creating a positive physical engagement. The machining holes in the button can then be machined away in the final cutting of the button. In other embodiments multiple mechanical and chemical engagement methods can be combined.

In various embodiments of a separate holding apparatus, the apparatus comprises a protrusion which serves as a means for the contact lens lathe to hold on to during the contact lens turning process. The apparatus further comprises a surface area, larger than the protrusion, on the opposite side of the protrusion. This surface area may serve as the mating surface that physically engages with the contact lens button. In another embodiment the mating surface can be the same size as the protrusion. In such an embodiment the mating surface would not mate with the entire mating surface of the button, decreasing the support and increasing flexure. However, holding apparatus manufacturing efficiencies are likely to be realized when the mating surface and the protrusion are the same or approximately the same diameter.

As stated previously and in other various embodiments, the button's mating surface can be configured such that there is increased efficiency relating to button material is machined away during the contact lens turning process. The holding apparatus can facilitate these efficiencies by providing a mating surface configured to mate uniformly with the more efficient button surface.

In this respect, in one embodiment of the apparatus, the mating surface may be conical in shape. In order for a contact lens button to mate to an apparatus with a conical mating surface, the contact lens button would have to have a corresponding conical surface. For a holding apparatus surface that is convexly conical, the contact lens button surface would be concavely conical. In the alternative, for a holding apparatus that is concavely conical, the contact lens button surface would be convexly conical. Thus, the holding apparatus mating surface would be able to seat uniformly against the button surface.

Figure 2:
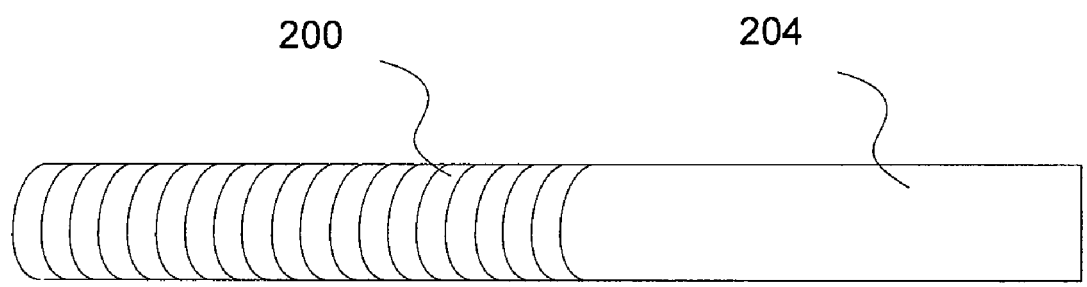
FIG. 2 is a cross sectional side view of contact lens stock showing the profile of curved front and back surface lens buttons as they are cut from the stock.

As illustrated in FIG. 1 depicting the cross section of lens stock 104, contact lens button 100 is typically cut from lens stock 104 as flat disks, buttons, or blanks. However, in another embodiment of the invention, the buttons can be parted off from the rods of contact lens material already having conical surfaces (or an otherwise desirable shape). For example, as illustrated in FIG. 2, it is envisioned that contact lens buttons 200 is cut from the contact lens stock 204 by a process that creates a curved surface on the contact lens button. Creating the button with a concave curved surface on one side of contact lens button and the convex curved surface on the opposite side of contact lens button.

Figure 3:
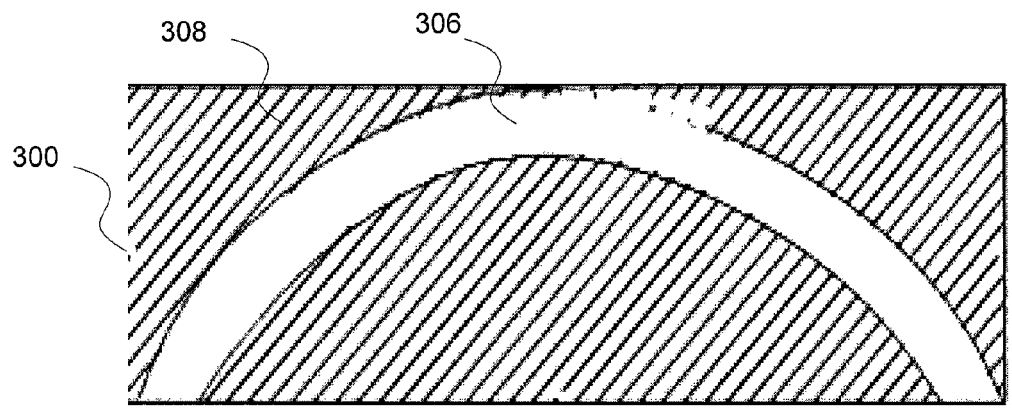
FIG. 3 is a cross sectional side view of a contact lens button showing the material that is removed and the material that is kept when machining a flat surface lens button.
Figure 4:
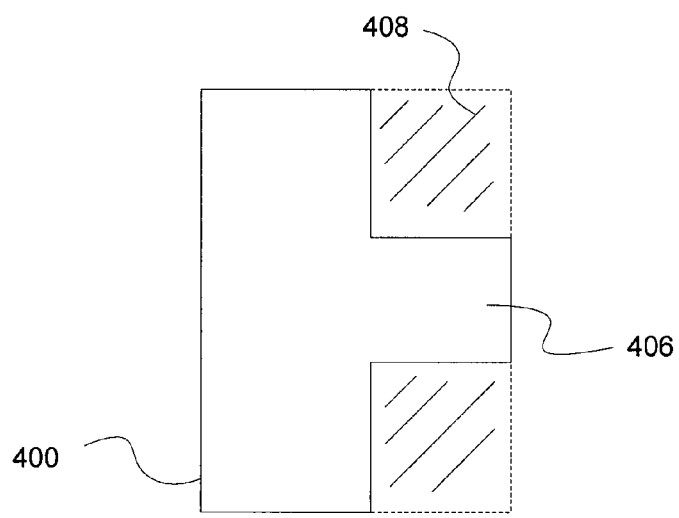
FIG. 4 is a cross sectional side view of a contact lens button showing the material that is removed to provide the button with a machining protrusion.

FIG. 3 is an exemplary illustration of the amount of material that could be lost when machining flat button 300 into a curved lens shape 306. Material 308 can be lost in a typical machining process described above. As also noted above, time and tooling may likewise be wasted when removing material 308. In contrast in accordance with the present invention, when button 200, such as that illustrated in FIG. 2, is turned on a lathe, less material is machined away and more lenses can be machined from a single rod of contact lens stock

204 additionally, less lens stock material 204 is lost, there is less wear on the tooling, and less time is wasted during machining. This creates efficiencies and overall economic savings in the manufacturing of this contact lens.

In various other embodiments of the holding apparatus, the mating surface of the holding apparatus can be any desired surface to increase contact lens machining efficiencies. A non-exclusive list of surfaces include: conical, spherical, aspherical, or any preferred surface specification that can be cut from stock material. In one embodiment, the mating surface shape attempts to approach the final dimensions of the contact lens, thus further reducing the amount of machining needed on the contact lens button. Again, in accord with this embodiment of the invention, the buttons cut from the contact lens rod stock are preferably cut such that one side of the button is a mirror image of the holding apparatus surface. Therefore, in accordance with such an embodiment, the contact lens rod stock can be cut with one concave surface and one convex surface. Thus, when the holding apparatus and the button stock are mated together and ultimately machined, very little material is actually removed from the button stock to create the final contact lens geometry.

In various other embodiments of the present invention, the holding apparatus mating surface may be concave or convex such that it can mate with either side of contact lens button. The button may be machined first by removing interior materials, forming the concave side of the contact lens, or machined first by removing exterior materials forming the convex side of the contact lens. The holding apparatus is designed to function such that it can hold the contact lens by the opposite side of button stock to be machined. Therefore, the holding apparatus may have either a concave or convex shaped mating surface.

Figure 5:
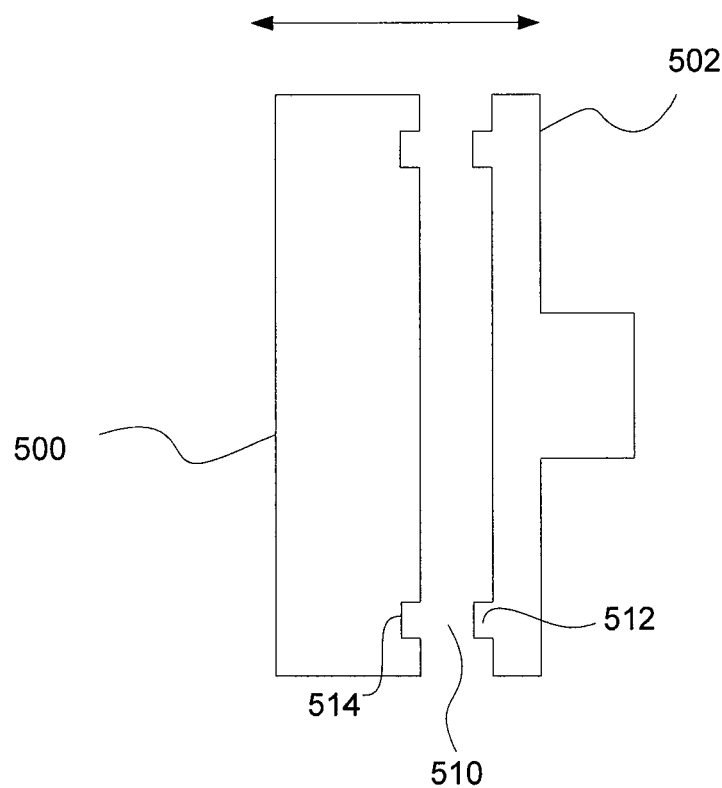
FIG. 5 is a cross sectional side view of a flat surface contact lens button and holding apparatus.

In another exemplary embodiment of the present invention and as illustrated in FIG. 5, holding apparatus 502 can be a separate device that engages or mates to contact lens button 500 by engagement mechanism 510. In this exemplary embodiment, apparatus 502 can be configured with a protrusion that can be held by the collet of a typical contact lens lathe. This exemplary embodiment merely illustrates one of many possible embodiments of a flat surface engagement between button 500 and holding apparatus 502. Also depicted in FIG. 5 is an exemplary embodiment of a mechanical engagement post 512 and corresponding button holes 514 which receive the posts.

Figure 6:
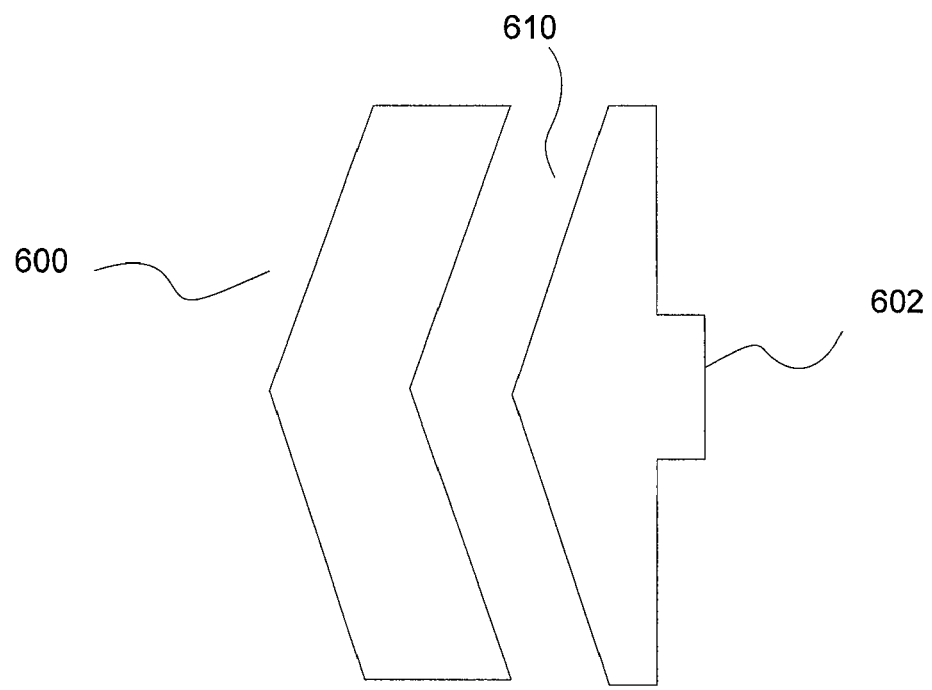
FIG. 6 is a cross sectional side view of a conical surface contact lens button and a conical surface holding apparatus.

In another exemplary embodiment of the present invention and as illustrated in FIG. 6, holding apparatus 602 can be a separate device that can engage or mate to contact lens button 600 by engagement mechanism 610. Like previous exemplary embodiments, apparatus 602 can be configured with a protrusion that can be held by the collet of a typical contact lens lathe. This exemplary embodiment illustrates one of many possible embodiments of a conical surface engagement between button 600 and holding apparatus 602.

Figure 7:
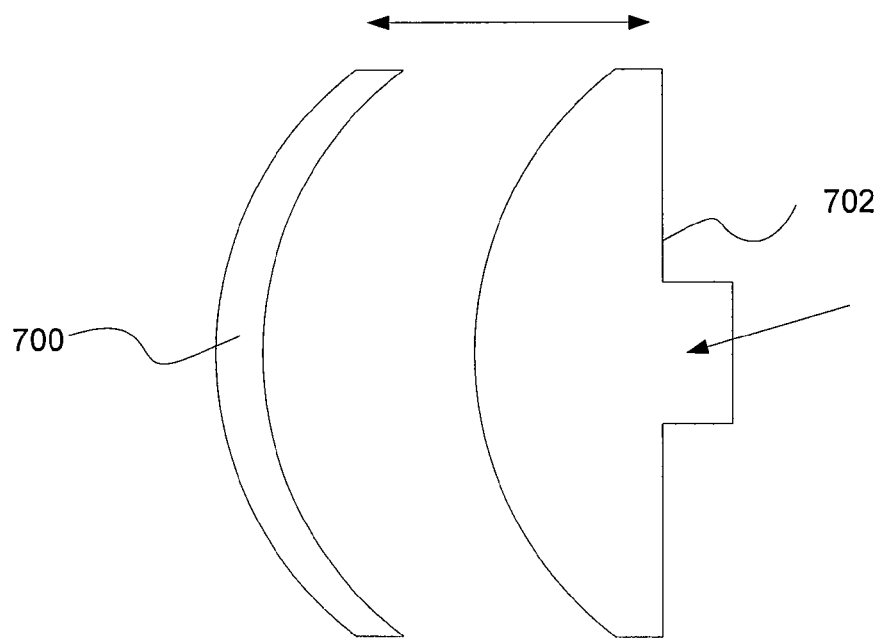
FIG. 7 is a cross sectional side view of a curved surface contact lens button and a convex curved surface holding apparatus.

In another exemplary embodiment of the present invention and as illustrated in FIG. 7, holding apparatus 702 can be a separate device that can engage or mate to contact lens button 700 by engagement mechanism 710. In this exemplary embodiment, apparatus 702 can be configured with a protrusion that can be held by the collet of a typical contact lens lathe. This exemplary embodiment illustrates one of many possible embodiments of a curved surface engagement between button 700 and holding apparatus 702.

Figure 8:
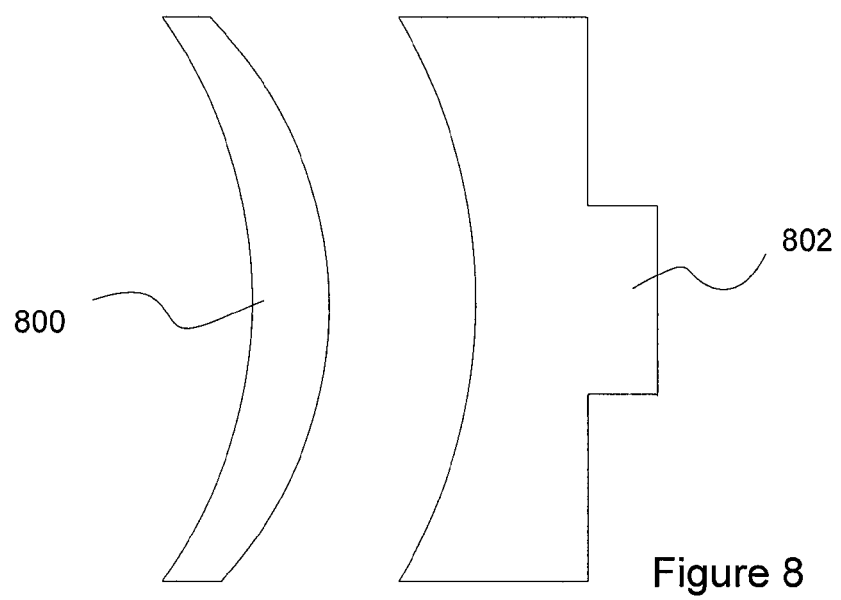
FIG. 8 is a cross sectional side view of a curved surface contact lens button and a concave curved surface holding apparatus.

Like FIG. 7 the exemplary embodiment of FIG. 8 illustrates a curved surface engagement. However, FIG. 8 further illustrates that the direction of the curved surfaces can be altered between the button and the holding apparatus. Holding apparatus 702 of FIG. 7 has a convex curved mating surface whereas holding apparatus 802 of FIG. 8 has a concave curved mating surface. Various exemplary embodiments for various surface geometries and specifications for lens buttons and holding apparatuses can occur in numerous combinations depending upon the specific demands of the situation. For example the order of machining operations or ultimate goal of efficiency and utility can dictate the proper combination. Buttons are envisioned being convex or concaved; the same is true for the holding apparatus. Further the button and the holding apparatus are envisioned having any surface specification that allows the holding apparatus to engage the button sufficiently to facilitate the machining operation on the button.

In exemplary embodiments, the holding apparatus can be constructed using any known manufacturing process that is suitable to provide the apparatus its desired characteristics. A non-exclusive list of examples may include casting, molding, forging, extruding, and machining. Furthermore the holding apparatus can be manufactured for single use purposes or multiple use purposes.

Moreover, in various embodiments, the apparatus can be manufactured from any material or combinations of material, such that the material allows the apparatus to perform any one of its objective functions. For example, the material must be of suitable strength to be held in a lathe while certain machining forces are put on the contact lens button stock. A non-exclusive list of examples of materials that may be incorporated in manufacturing the holding apparatus are polyethelyne (HDPE), ultra-high molecular weight polyethelyne (UHMW-PE), polyoxymethelyne (e.g., Delrin®), polytetrafluoroethylene (e.g., Teflon®), polyethylene terephthalate, glass, ceramic, metal, and the like, or any combination thereof.

In various exemplary embodiments, the holding apparatus can be manufactured as one piece or as multiple pieces. In one example the protrusion and the mating surface may be two separate pieces held together by a mechanical or chemical fastener. In a related embodiment, the protrusion can be interchangeable between different mating surfaces. For example, the protrusion could be switched from a concave mating surface to a convex mating surface.

In various exemplary embodiments, the holding apparatus may also be configured to reduce mass, material, and cost (provided that generally, the overall geometry and functionality is maintained). In this regard, the apparatus may be configured as a solid material and/or be configured with voids or cavities.

In various exemplary embodiments, the holding apparatus may have informational features. For example, such features can provide summary instruction of how the holding device functions or how it assembles with blanks and lathe collets. In another example, the informational features can indicate locations of relevant features on the button. In still another example, the information features can describe the size, surface configuration, type, nature, or intended purpose of the holding apparatus. As an example, such informational features can include marks, colors, or labeling.

The foregoing disclosure is illustrative of the present invention and is not to be construed as limiting the invention. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention, and are not to be construed as limited to the specific embodiments disclosed.

What is claimed is:

1. A method for turning contact lens stock comprising:
cutting a lens button stock from a lens rod stock, wherein the lens button stock is cut from the lens rod stock to have a concave surface and an opposite convex surface on the lens button stock;
coating a mating surface of a lens button stock holding apparatus with an adhesive, wherein the mating surface is configured to mate uniformly with either the concave surface or the opposite convex surface;
attaching the mating surface to the lens button stock;
positioning a protrusion of the lens button stock holding apparatus in a collet on a lathe;
turning the lens stock to the desired specifications to create a lens; and
bathing the lens in a solvent to remove the lens button stock holding apparatus from the lens.

* * * * *